United States Patent
Murphy-Chutorian et al.

(10) Patent No.: US 10,909,764 B2
(45) Date of Patent: Feb. 2, 2021

(54) PROVIDING AUGMENTED REALITY TARGET IMAGES IN A WEB BROWSER

(71) Applicant: 8th Wall Inc., Palo Alto, CA (US)

(72) Inventors: Erik Murphy-Chutorian, Palo Alto, CA (US); Nicholas Butko, Cupertino, CA (US)

(*) Notice: Subject to any disclaimer, the term of this patent is extended or adjusted under 35 U.S.C. 154(b) by 0 days.

(21) Appl. No.: 16/451,965

(22) Filed: Jun. 25, 2019

(65) Prior Publication Data

US 2020/0410759 A1 Dec. 31, 2020

(51) Int. Cl.
| | |
|---|---|
| *G06T 19/00* | (2011.01) |
| *G06T 7/246* | (2017.01) |
| *G06T 1/20* | (2006.01) |
| *G06F 16/957* | (2019.01) |
| *G06F 8/41* | (2018.01) |
| *G06T 7/80* | (2017.01) |

(52) U.S. Cl.
CPC .......... *G06T 19/006* (2013.01); *G06F 8/4441* (2013.01); *G06F 16/957* (2019.01); *G06T 1/20* (2013.01); *G06T 7/246* (2017.01); *G06T 7/80* (2017.01); *G06T 2207/30204* (2013.01); *G06T 2207/30244* (2013.01)

(58) Field of Classification Search
None
See application file for complete search history.

(56) References Cited

U.S. PATENT DOCUMENTS

2018/0211404 A1* 7/2018 Zhu .......................... G06T 7/70

OTHER PUBLICATIONS

Goldfus, "Building AR/VR with Javascript and HTML" https://blog.halolabs.io/building-ar-vr-with-javascript-and-html-97af4434bcf6, Jun. 2018 (Year: 2018).*
Brad Macintyre, "A Truly Responsive WebXR Experiment: A-Painter Xr", https://blog.mozvr.com/responsive-webxr-a-painter-xr/, Mar. 2018 (Year: 2018).*
Uday Hiwarale, "Parallel programming in JavaScript using Web Workers", https://itnext.io/achieving-parallelism-in-javascript-using-web-workers-8f921f2d26db, Mar. 2018 (Year: 2018).*
Amir Bozorgzade, "WebVR is becoming WebXR to make a simple, unified framework for all devices", https://venturebeat.com/2018/02/01/webvr-is-becoming-webxr-to-make-a-simple-unified-framework-for-all-devices/, Feb. 1, 2018 (Year: 2018).*

(Continued)

*Primary Examiner* — Nicholas R Wilson
(74) *Attorney, Agent, or Firm* — Joseph L. Acayan

(57) ABSTRACT

Implementations generally relate to providing augmented reality in a web browser. In one implementation, a method includes capturing images of a physical scene with a camera of a device. The method further includes determining motion of the camera using six degrees of freedom (6DoF) marker-based tracking. The method further includes determining positions of markers relative to the camera using 6DoF marker-based tracking. The method further includes overlaying virtual content onto a depicted physical scene in the images, resulting in augmented reality (AR) images. The method further includes rendering the AR images in a browser of the device.

18 Claims, 16 Drawing Sheets

(56) References Cited

OTHER PUBLICATIONS

Avid Voyles, "Getting Started with Emscripten: Transpiling C/C++ to JavaScript/HTML5", https://www.sitepoint.com/getting-started-emscripten-transpiling-c-c-javascript-html5/, Oct. 29, 2015 (Year: 2015).*
Gong et al., "JITProf: Pinpointing JIT-unfriendly JavaScript Code", ACM, 2015. (Year: 2015).*
Rister et al., "A Fast and Efficient Sift Detector Using the Mobile GPU", IEEE 2013. (Year: 2013).*

\* cited by examiner

1100

PROVIDING AUGMENTED REALITY TARGET IMAGES IN A WEB BROWSER

BACKGROUND

Image detection-based augmented reality is an interactive experience where a system augments predefined image markers in the real-world environment with computer-generated objects. AR technology may be provided using technologies such as image detection or marker-based image tracking, which is a technique for determining the position of a target object in a camera feed or equivalently determining the position of a camera relative to a target object or set of target objects in parallel. Image detection-based AR is typically implemented in native applications in order to perform at adequate speeds. There is some effort to provide web-based AR, but such technologies are limited in function, too slow in their execution, and require specialized browsers.

SUMMARY

Implementations generally relate to providing augmented reality in a web browser. In one implementation, a method includes capturing images of a physical scene with a camera of a device. The method further includes determining motion of the camera using six degrees of freedom (6DoF) marker-based tracking. The method further includes determining positions of markers relative to the camera using 6DoF marker-based tracking. The method further includes overlaying virtual content onto a depicted physical scene in the images, resulting in augmented reality images. The method further includes rendering the AR images in a browser of the device.

Other aspects and advantages of the described implementations will become apparent from the following detailed description, taken in conjunction with the accompanying drawings, illustrating by way of example, the principles of the described implementations.

DETAILED DESCRIPTION

Implementations generally relate to providing augmented reality (AR) in a web browser. More specifically, a system utilizes various web technologies to achieve six degrees of freedom (6DoF) marker-based tracking. The system uses these techniques to execute an AR web application in a web browser. Implementations achieve AR in the web browser without need to customize the browser, and without the need to install a native application. Implementations enable the AR web application to work with existing web standards to provide fast AR in current and future web browsers.

As described in more detail below, in various implementations, a system captures images of a physical scene with a camera of a device. The system then determines feature points from the images. The system also tracks the feature points in the images using 6DoF marker-based tracking. The system then determines positions of markers relative to the camera using 6DoF marker-based tracking. The system then overlays virtual content onto the physical scene in the images resulting in AR images. The system then renders the AR images in a browser of the user device.

Figure 1:
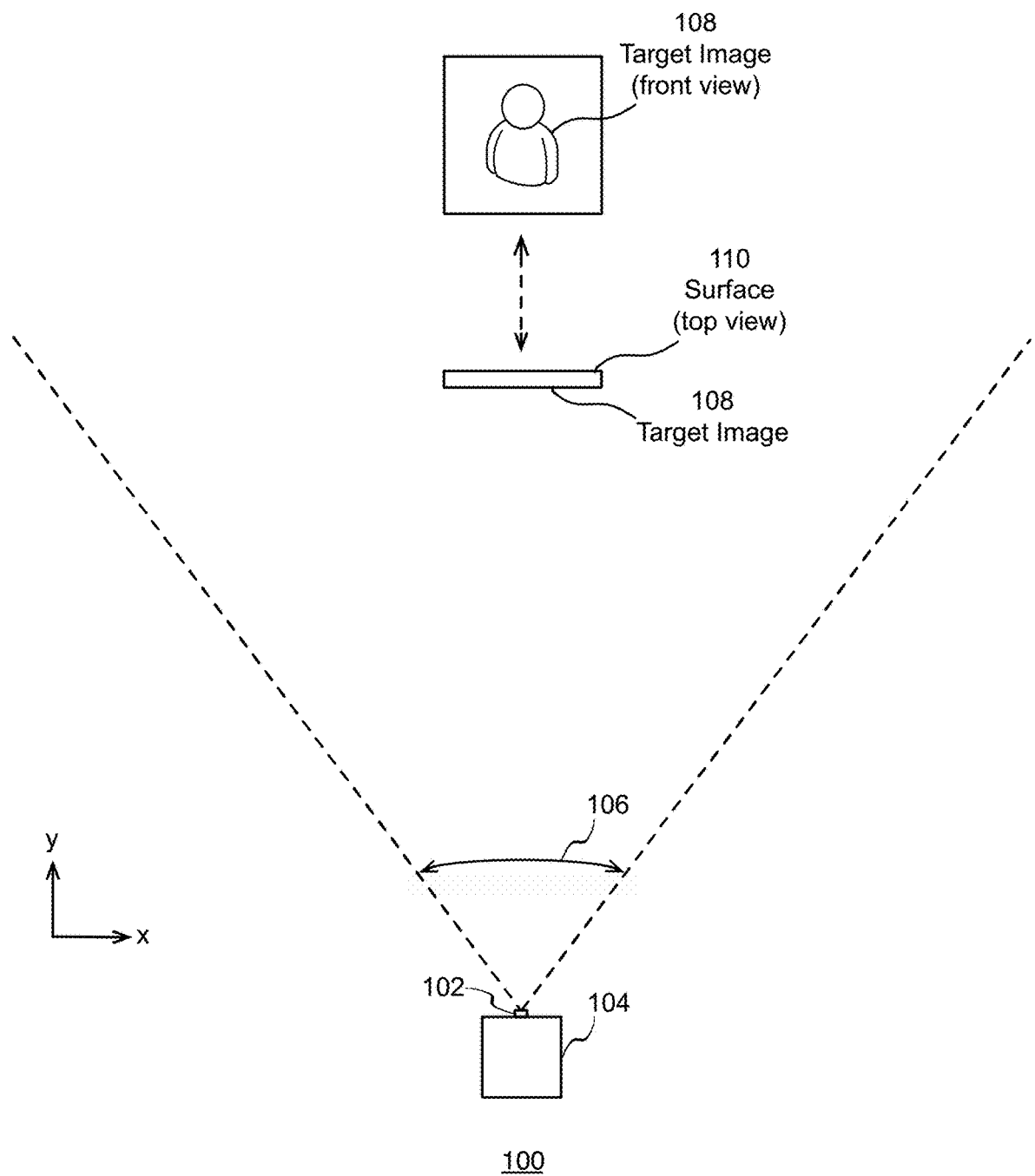
FIG. 1 illustrates a top-view diagram of an example physical environment, including a camera in a first position relative to an example target image, according to some implementations.

FIG. 1 illustrates a top-view diagram of an example physical environment 100, including a camera in a first position relative to an example target image, according to some implementations. As shown, a camera 102 is attached or integrated with a mobile unit 104 or device 104. Mobile unit 104 may represent various items that have an incorporated or attachable camera. For example, mobile unit 104 may be a mobile device such as a cell phone, as well as a robot, a vehicle, a rover, etc.

Camera 102 has a predetermined field of view 106 through which camera 102 observes the physical world at any given moment, including objects such as a target image 108, for example. As shown, camera 102 is in a first position relative to target image 108. For ease of illustration, only one example target image 108 is shown. In various scenarios, camera 102 may observe multiple target images in field of view 106. Note that the terms "target image" and "image target" may be used interchangeably.

Also shown is a front view of target image 108 to illustrate what camera 102 captures. As described in more detail herein, the system identifies and tracks target image 108, as well as other objects in field of view 106 of camera 102. As shown, camera 102 has a target image 108 in field of view 106. In various implementations, target image 108 is shown on a base surface 110, where the surface may be any type of surface, which may vary depending on the particular implementation. For example, target image 108 may be on a poster that is hanging on a wall. In another example, target image 108 may be on a display screen mounted on a wall. In another example, target image 108 may be on a display screen of a computer, tablet, mobile device, etc.

In various implementations, target image 108 is predefined such that statistics and attributes of target image 108 are known to the system. For example, the system may store metadata associated with target image 108. Such metadata may include, for example, locations of pixels, pixel values, dimensions and locations of objects in target image 108, etc.

Figure 2:
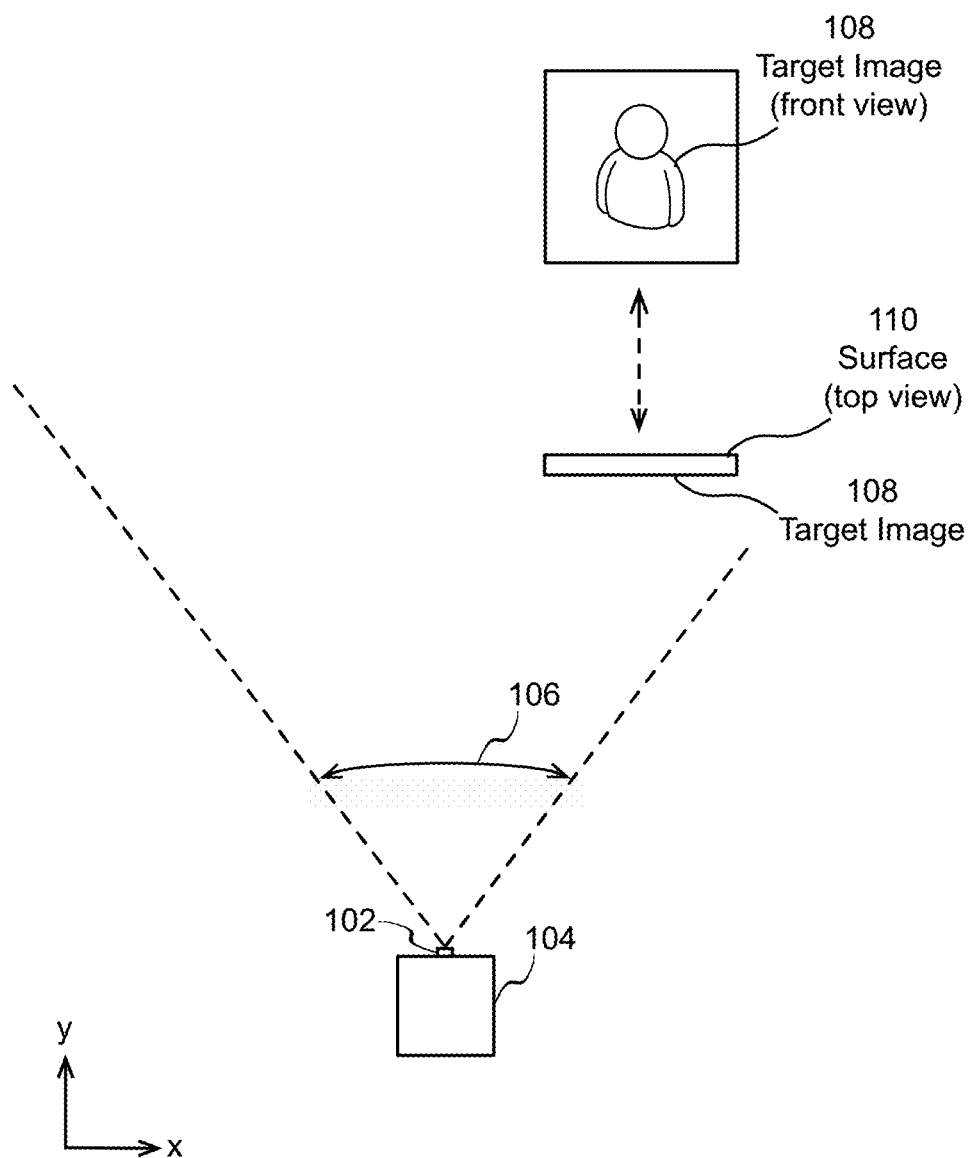
FIG. 2 illustrates a top-view diagram of an example physical environment, including the camera in a second position relative to the example object, according to some implementations.

FIG. 2 illustrates a top-view diagram of physical environment 100 of FIG. 1, including camera 102 in a second position relative to target image 108, according to some implementations. As shown, in the second position, camera 102 has moved closer to target image 108 along a y-axis and has moved to the right of target image 108 along an x-axis. As shown, target image 108 is presented on surface 110.

Figure 3:
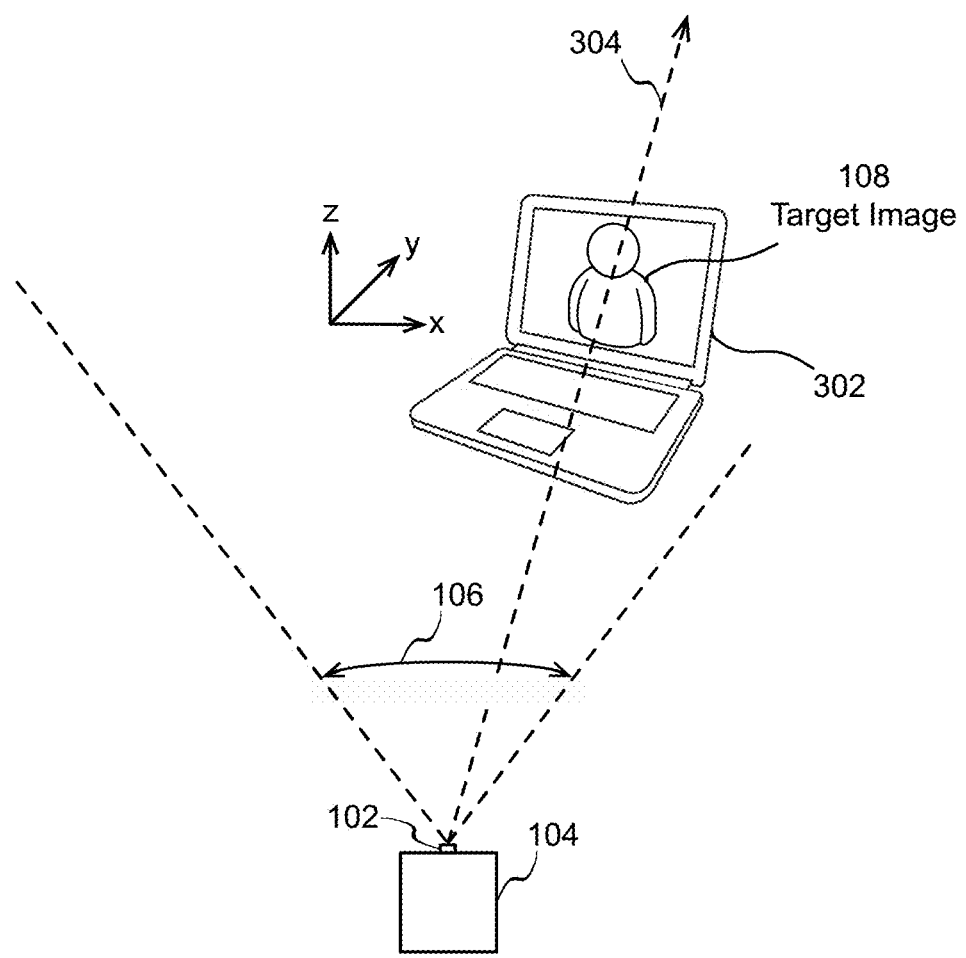
FIG. 3 illustrates a perspective-view diagram of an example target image being displayed on a computer and being displayed at an angle relative to camera, according to some implementations.

FIG. 3 illustrates a perspective-view diagram of target image 108 being displayed on a computer and being displayed at an angle relative to camera 102, according to some implementations. In various implementations, the system finds 2-dimensional (2D) objects such as target image 108 that are situated in a 3-dimensional (3D) environment with perspective distortion. In this particular example implementation, target image 108 is presented on an electronic display screen of a laptop computer 302. As indicated above, the surface on which target image 108 is displayed may be any surface. Such a surface may be a poster or advertisement, a display of a smart phone, virtual reality (VR) and/or augmented reality (AR) devices, etc.

In various implementations, while the system may utilize technologies such as SLAM to track 3D objects in the environment, the system does not require SLAM to track 2D objects such as target image 108.

As indicated above, in various implementations, the attributes of target image 108 such as its geometry is predefined. For example, the system may know in advance that the surface on which target image 108 is presented is flat. The system may use SLAM to determine the full 3-D representation of the scene as it relates to target image 108. Because the system knows that target image 108 is flat, the system knows that target image 108 is in 2D unlike other objects in the 3D environment.

As shown, target image 108 is within the field of view 106 and lies along a ray or line 304. Line 304 may be based on the center point of the lens of camera 102. The system might not know the actual size of target image 108 but may determine the position of target image 108 on line 304 and how target image 108 is oriented on line 304.

Figure 4:
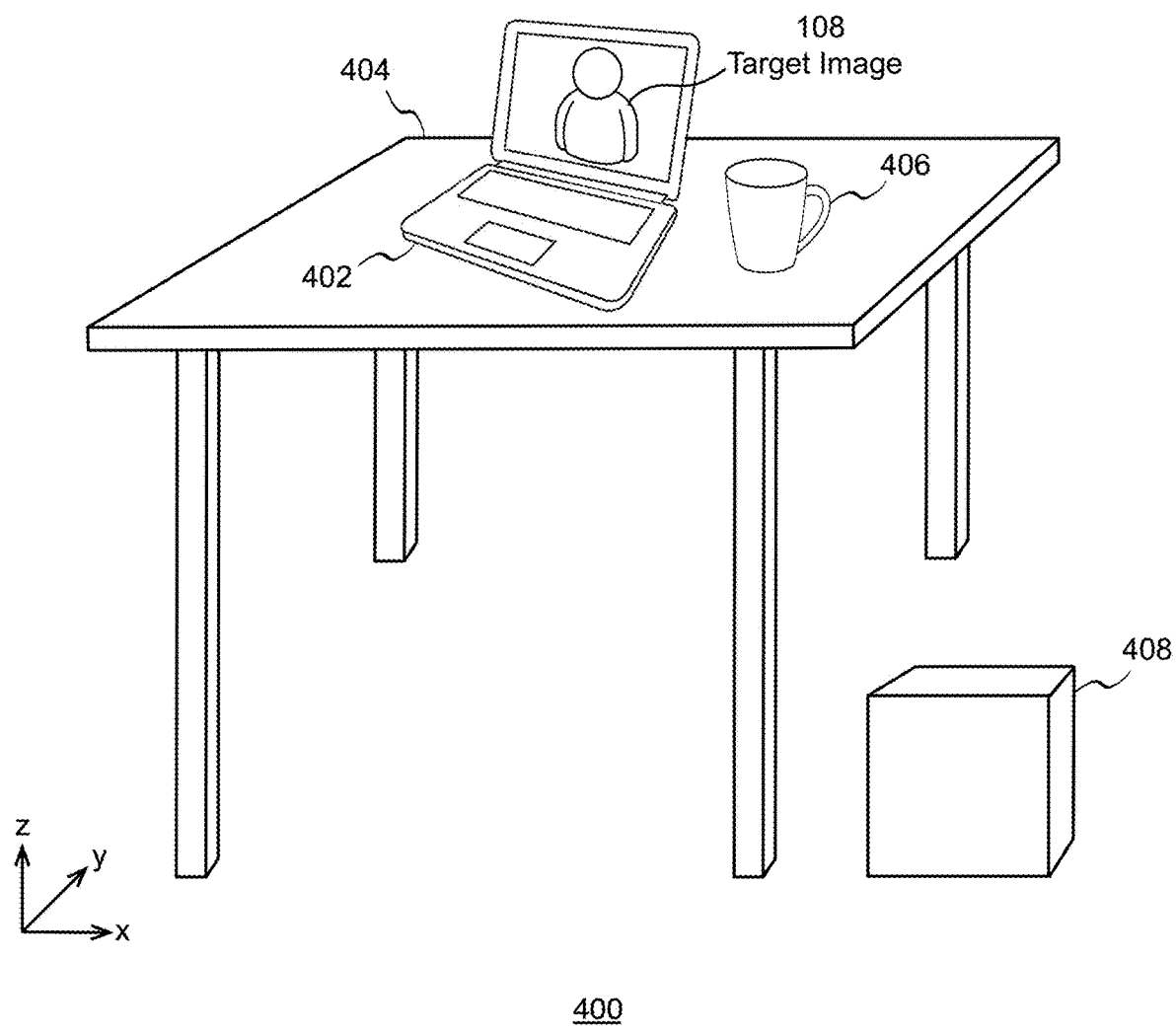
FIG. 4 illustrates a perspective-view diagram of an example target image being displayed on a computer and being displayed with other objects in an environment, according to some implementations.

FIG. 4 illustrates a perspective-view diagram of target image 108 being displayed on a computer and being displayed with other objects in an environment 400, according to some implementations. As described in more detail herein, a 3D view of the physical environment may be projected into the view of camera 102 (e.g., via the camera lens of the camera). The camera may then capture images of the 3D view, including any objects in field of view of the camera. The camera may capture images in multiple image frames as camera moves within environment 400. In some implementations, the camera may also function as a video camera while capturing image frames.

As shown, the system may capture not only target image 108, but also 3D objects in environment 400. For example, shown is target image 108 shown on a laptop computer 402, which is placed on a table 404. Also sown in environment 400 is a mug 406 placed on table 404 and another object 408 placed on the ground. Object 408 may represent any object such as a chair, etc. In various implementations, there may be any number of resting surfaces and objects placed on or around such surfaces.

As described in more detail herein, the system may utilize a camera such as camera 102 to capture a point cloud space. The point cloud space may represent physical environment 400, where the point cloud space is made up of map points, also referred to as feature points. These map points constitute a 3D map of the physical space. In various implementations, some of the map points may be projected into the view of the camera, captured in 2D images frames. In some implementations a point cloud space may be represented in Cartesian coordinates or in other suitable coordinate system coordinates (e.g., polar, cylindrical, spherical, and/or homogeneous coordinates, etc.). Such coordinate system coordinates uniquely determine the position of each map point in the point cloud space.

As described in more detail herein, a neural network may utilize movement information associated with the captured 2D image frames to determine the position of the camera in the point cloud space of the physical environment. The neural network may determine how the map points move. For example, a neural network may estimate 6DoF camera motion from a point cloud, or directly from pixels. Alternatively, a neural network may be used solely for the generation of feature points, which are then input to a traditional target image tracking system. Based on movement information associated with the map points, the neural network determines the self-position of the camera. Example implementations of the point cloud space and the determination of the self-position of a camera are described in more detail herein.

Figure 5:
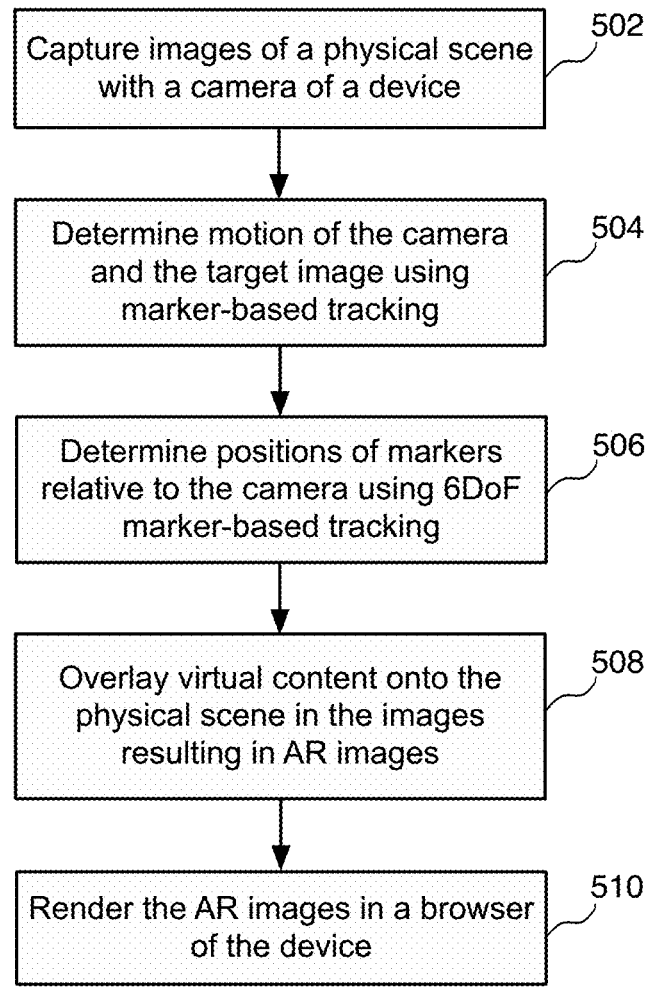
FIG. 5 illustrates an example flow diagram for determining the motion of a camera, according to some implementations.

FIG. 5 illustrates an example flow diagram for determining the motion of a camera, according to some implementations. In various implementations, a method is initiated at block 502, where the system captures images of a physical scene with a camera of a device. For example, FIG. 1 through FIG. 4 show various physical scenes or environments with target image 108, where camera 102 captures images of the physical scene or physical environment. In various implementations, a graphics processing unit (GPU) processes captured images from the camera.

At block 504, the system determines the motion of the camera and target images using 6DoF marker-based tracking. In various implementations, to determine the motion of the camera, the system extracts map points/feature points from the images, which may be performed by a neural network. In various implementations, the system analyzes the physical environment, including objects in the physical environment, by determining feature points from the images. The feature points may include fixed surface points in the physical scene, as well as feature points on various objects in the physical scene.

Figure 6:
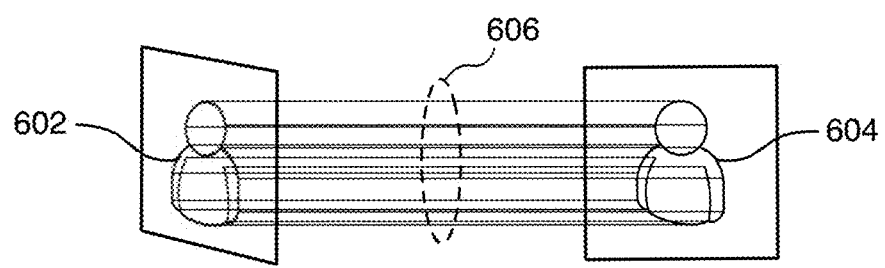
FIG. 6 illustrates an example mapping of feature points in an example captured target image corresponding to a canonical version of the target image, according to some implementations.

FIG. 6 illustrates an example mapping of feature points in a captured target image 602 corresponding to a canonical version 604 of target image 602, according to some implementations. While the description above in connection with FIG. 5 describes a detection flow for how the system may initially detect a target image, the following describes a predictive tracking flow. Shown are multiple lines 606, where a given line maps a feature point of target image 602 to a feature point of a canonical version 604 of target image 602.

In various implementations, the system uses the position of detected target images in a given frame to modify camera processing in future frames. When predicting the location of target images for GPU processing, the system may take into account the position of the target image. In some implementations, the system may predict the location the target image from other target images. For example, if the system knows that an image A is to the left of an image B, the system would observe the camera moving away from image B toward the left. The system may predict that it is about to see image A. The system may then instruct the GPU to process the region of the image where the system would expect image A to appear even though the system has not yet seen image A. In various implementations, doing may involve estimating the relative location of target images, remembering that estimation, and applying it to future frames.

In various implementations, the GPU detects target image 602 in a frame. the GPU produces canonical version 604 that the GPU predicts will match target image 602 via a perspective image warp. The GPU extracts features based on the GPU prediction, and matches the features to target image 602. The GPU transforms matched feature points with the inverse perspective image warp to their location in the camera frame. The GPU computes a pose from the point matches from the camera-frame to the target-frame. Depending on the available GPU resources, multiple targets may be tracked simultaneously with predictive tracking as described above.

Figure 7:
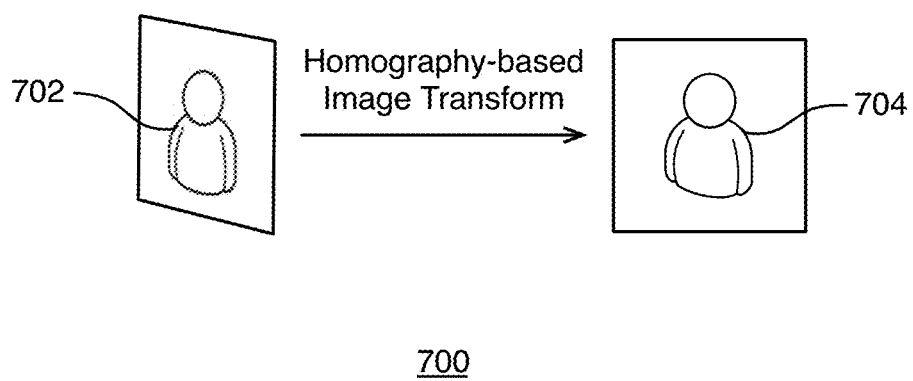
FIG. 7 illustrates an example target image that is transformed to a canonical version of target image, according to some implementations.

FIG. 7 illustrates an example target image 702 that is transformed to a canonical version 704 of target image 702. In various implementations, the system may perform a homography-based image transform. In various implementations, the system uses robust optimization methods (e.g., gradient descent with robust loss, etc.) to solve for a camera position. For example, the system may solve for a camera position by finding an optimal homography from the captured image to the target.

In various implementations, the system may use various different approaches for finding the target image position. Such approaches may be based on whether the system is trying to find the target in a whole image (e.g., initial detection) or in a subsequent image (e.g., tracking).

In various implementations, for a whole image case, the system computes point-matches from the camera to the target image, as described above in connection with FIG. 6, for example. The system may use a robust framework to find the target position. Example robust frameworks may include random sample consensus (RANSAC) techniques, square regression algorithm (LMedS) techniques, etc. In some implementations, the system may sample multiple many sets of three points from the set of matches. The system may compute for different camera positions that are mathematically consistent with the target location for those three points. In some implementations, the system may reject camera positions that are at implausible positions or angles. In some implementations, the system finds the camera position from among all of the proposals that are most consistent with the total set of point matches. The system rejects outliers.

For a tracked image case, the system computes point-matches from camera to the target image (as described above in connection with FIG. 6). In various implementations, the system starts with a guess about camera pose from a previous detection. The system then computes the homography from the camera position that maps camera-frame location to target-frame location. The system then computes the robust loss of positional error with respect to target-frame point locations. The system then computes the gradients of the loss function with respect to the camera pose guess using the chain rule. The system then updates the guess about camera pose to a new guess. In some implementations, if a termination criterion is reached, the system returns the current estimated pose. The system again computes the robust loss of positional error with respect to target-frame point locations, then computes the gradients of the loss function with respect to the camera pose guess using the chain rule, and then updates the guess about camera pose to a new guess.

Referring again to FIG. 5, at block 506, the system determines positions of markers relative to the camera using 6DoF marker-based tracking.

At block 508, the system overlays virtual content onto a depicted physical scene in the images, resulting in augmented reality (AR) images. As described in more detail herein, the virtual content is computer-generated content that the system accesses using various web technologies. In various embodiments, the content may be 2D content and/or 3D content.

Figure 8:
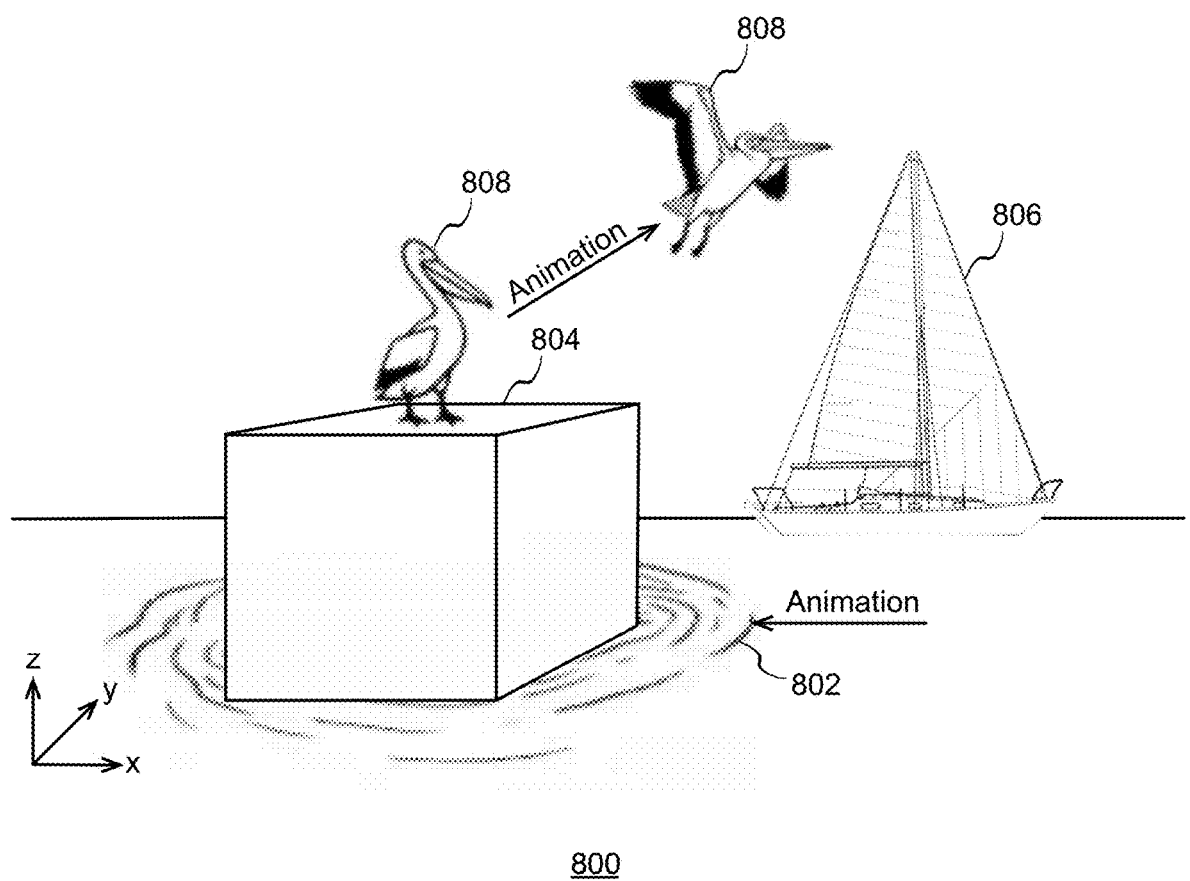
FIG. 8 illustrates an example target image with animations, according to some implementations.

FIG. 8 illustrates an example target image 800 with animations, according to some implementations. Also shown are various virtual objects that are overlaid on the scene. For example, an object 802 representing water is shown underneath and around portions of an object 804. In some implementations, the system may show an animation of object 802 to provide an effect of object 804 floating on moving water. An object 806 representing a sailboat is also shown. Object 802 also contributes to an effect of the sailboat floating on water. Also shown is an object 808 representing a pelican standing on target image 804 and an object 808 representing a pelican flying away. As shown, the system may generate a virtual version of object 808 (the pelican) flying away from object 804. In some implementations, the system may cause object 808 (the pelican) to fly out of and away from the 2D surface and into the 3D space.

The specific types of virtual 3D content may vary, depending on the particular implementation. While the example content shown involves a theme (e.g., an ocean theme), the content may include any theme or themes, or any group of objects that may or may not fall into a particular theme. Furthermore, while implementations are described herein in the context of virtual visual objects, the system may augment the physical scene with various types of perceptual information. For example the system may augment the physical scene/user experience across various sensory modalities (e.g., visual, auditory, haptic, somatosensory, olfactory, etc.). The particular augmentations and/or combination of sensory modalities may vary, depending on the particular implementation. In some implementations, the system may conform virtual 3D objects to the perspective captured in the image frame (e.g., virtual train tracks having the same perspective as real life train tracks disappearing into the distance). Also, the system may scale virtual 3D objects to match the scale in the image frame.

Referring still to FIG. 5, at block 510, the system renders the AR images in a browser of the device. The rendered AR image is a 3D scene that the user can interact with in the browser of the device. The particular type of device may vary, depending on the particular implementation. For example, in various implementations, the device is a mobile device. The mobile device may be a smart phone, a tablet, a notebook computer, a smart watch or other wearable device (e.g., smart glasses, etc.).

Figure 9:
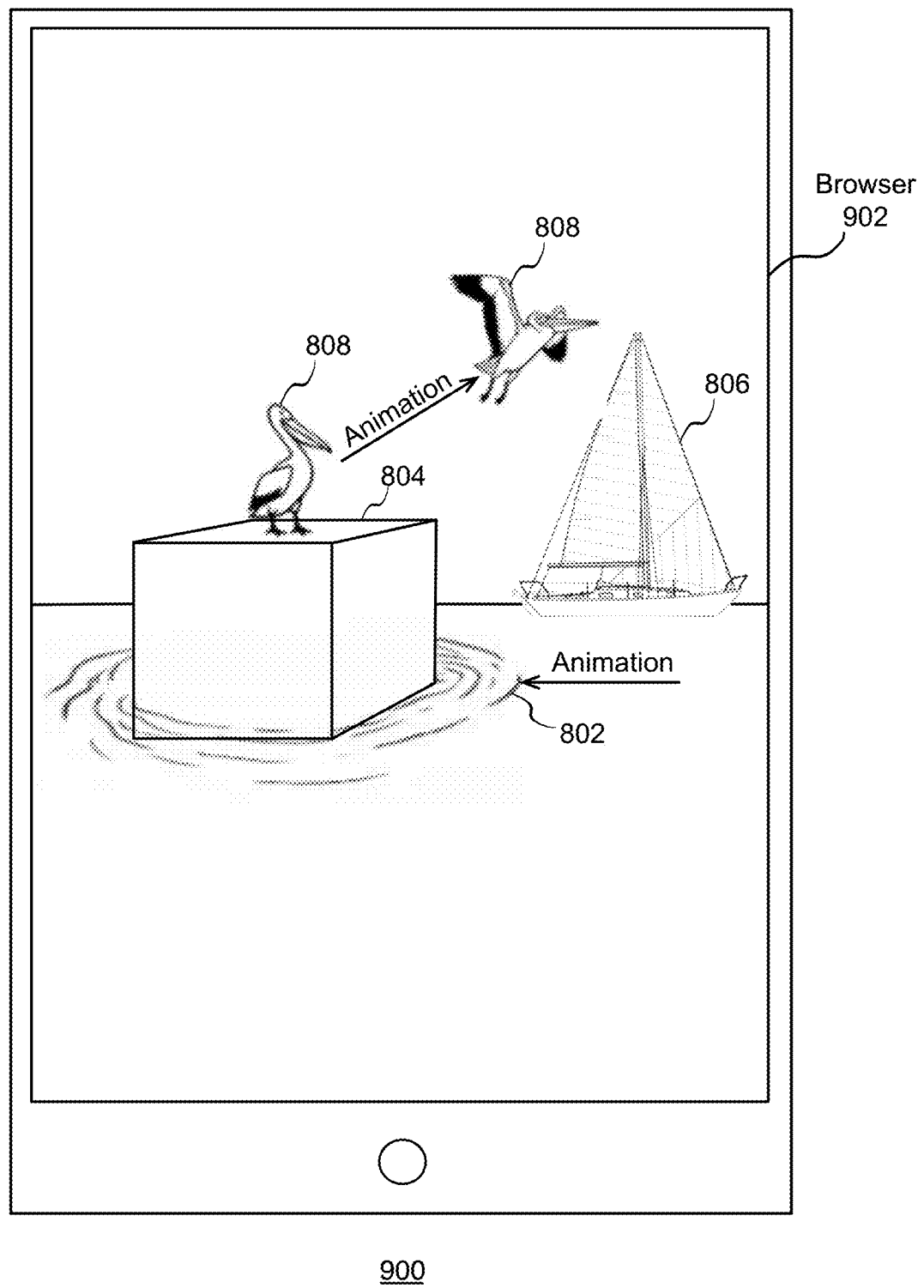
FIG. 9 illustrates an example augmented reality scene that is displayed in a browser, according to some implementations.

FIG. 9 illustrates an example augmented reality scene that is displayed in a browser, according to some implementations. Shown is the AR scene of FIG. 9 rendered on a mobile device 900. For ease of illustration, the elements shown in FIG. 9 are the same as those shown in FIG. 8. As shown, the system is rendering the AR scene in a browser 902 of mobile device 900. In various implementations, the system enables the user to add virtual objects, remove virtual objects, and manipulate virtual objects in the rendered AR scene as the user and camera move through the physical scene. In various implementations, the system enables the user to modify all objects in the rendered AR scene (e.g., change colors, add or remove visual effects, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following describes various web technologies that enable the system to provide AR scenes in a web browser based at least in part on a web application that is executed in the browser. Various web technologies that enable fast execution of the web application in the browser are described in more detail herein.

In various implementations, the system performs operations to provide AR in a browser based at least in part on a predetermined subset of JavaScript transpiled or compiled from source code of another programming language that has a similar or different level of abstraction. Various transpiler and/or compiler techniques may be used to transpile/compile/transform source code written in one language to JavaScript, Web Assembly, or any other format that can be interpreted and executed by a web browser. For example, in some implementations, a source-to-source compiler runs as a back end to a low-level programming language (LLVM) compiler to output the predetermined set JavaScript. An example source-to-source transpiler or compiler or may include Emscripten or another suitable source-to-source compiler.

In various implementations, the predetermined subset of JavaScript may vary, depending on the particular implementation. For example, in some implementations, the predetermined subset of JavaScript may be asmjs. In some implementations, the compilation target may also include other web-executable input formats such as WebAssembly. As such, an image tracking engine may be written in a language such as C++ and then be transpiled or compiled into a predetermined subset of JavaScript such as asmjs, WebAssembly, etc. The resulting subset of JavaScript or webcode may be stored in a library such as an asm.js library, WebAssembly library, etc.

In various implementations, the predetermined set of JavaScript enables computer software written in languages such as C, C++, etc. to be run as web applications while maintaining performance characteristics substantially better than standard JavaScript, almost as fast as native code. For example, an image tracker may run at 5 frames per second. As described in more detail herein, the system may use additional web technologies to increase performance (e.g., 30 frames per second, 60 frames per second, etc.). Such increased speeds enable fast marker-based tracking without needing a specialized browser.

In some implementations, a bitcode generator or compiler front end may be used on top of an LLVM compiler. The LLVM compiler takes code and converts the code to an intermediate representation, which then may be optimized before the final assembly language output. The particular compiler front end may vary, depending on the particular implementation. An example compiler front end may be Clang. For example, Clang may be the compiler front end that drives the actual LLVM compiler. A compiler or transpiler such as Emscripten, for example, may consume the output of a bitcode generator/compiler front end, and compile or transpile it to the predetermined subset of JavaScript for yet faster speed for the purpose of markerless 6DOF tracking.

In some implementations, C++ code may be revised specifically to optimize the performance of the generated JavaScript. For example, in some implementations, portions of the C++ code may be written such that the system avoids simultaneous reading from one block of memory and writing to another block of memory. This substantially improves the efficiency of the generated JavaScript.

In some implementations, the system uses a graphics card to access a standard graphics library to execute the web application and other web technologies on the web. The graphics card may be standard on the device. Such libraries are used for code that runs on a graphical processing unit (GPU). In various implementations, the system causes a GPU of the graphics card to perform computations by using a rendering pipeline, which renders computer vision features. An example rendering pipeline implementation is described in more detail herein. The system executes on the graphics card not only for rendering images but also for processing images and associated data. Graphics libraries may include, for example, standard web graphics framework such as Web Graphics Library (WebGL), or other web graphics frameworks, including ones based on future standards.

In various implementations, the system processes the images using a computer program executed on a graphics processing unit (GPU). The system extracts feature points from the images using a shader, or performs other computations, which may or may not be an implementation of a neural network or other machine learning system. The system also performs runtime optimizations to JavaScript frameworks (e.g., by adding caching layers to improve their speed). In various implementations, a shader is a small program in the GPU that run for specific sections of the graphics pipeline. In various implementations, the system uses a shader to access the application programming interface (API) to the graphics library and to perform a combination of image filtering and feature point extraction. The system uses the shader to produce inputs to a JavaScript computer vision library. The system may then use a WebGL rendering loop to perform fast work using a GPU, work that would otherwise be performed more slowly by a CPU and JavaScript, or to execute code in parallel on different computational subsystems.

In various implementations, the graphics library used is a library for programming code that goes onto a graphics card. In various implementations, a transpiler or compiler may be used to take OpenGL code (C++ code) and transpile or compile it into WebGL code (JavaScript code). In some implementations, everywhere that C++ code has a call to a graphics library function (e.g., OpenGL function), the system replaces it with a JavaScript call to a JavaScript WebGL function. In some implementations, the system may augment existing JavaScript frameworks in order to improve their efficiency. For example, the system may add a cache layer to WebGL.

In various implementations, the system performs operations including performing multithread execution of JavaScript in the browser. Implementations use web technologies in web browsers that enable the system to run pieces of work asynchronously on a different CPU thread, which enables multithreaded JavaScript execution. This is especially beneficial for utilizing multiple CPUs in a standard mobile device. This overcomes the limited efficiency of typical web applications that are limited to a single CPU thread. For example, the system may run a script operation in a background thread or worker thread that is separate from the main execution thread of a web application. As such, the background thread performs computations that consume a substantial amount of resources and time. This frees up the main execution thread to optimally run without compromising speed. In some implementations, to achieve this, the system may use a worker constructor to create a worker object that executes a script (e.g., a JavaScript file, etc.) that is run in the background thread. A worker constructor may be Web Workers, for example.

In various implementations, the system utilizes a pixel-processing or computation pipeline that maximizes throughput in order to process as many frames as possible. This pipeline utilizes multiple processors, including GPUs and CPUs, in parallel. The GPU on the graphics card performs work while the CPUs are processing data, where the GPU is zero or more steps ahead of the CPU. The GPU renderer is zero or more frames behind the CPU. This parallelism enables two or more different processing units on the device to work simultaneously.

In some implementations, within a frame (independent of the pipeline), the order of issuing graphics processing, cpu processing, and graphics rendering functions, are optimize either statically, dynamically based on device characteristics, or dynamically based on runtime characteristics. Also, the pipeline execution strategy is optimized to have, for example, 0, 1, 2, 3, or more frames of delayed processing to maximize the balance of tracking accuracy and frame throughput. In the case of 0, the GPU and CPU work occur sequentially in a single frame. In the case of 1, the GPU and CPU work occur in parallel as described herein. In the case of 2, there is a single buffer frame. In the case of 3, there are two buffer frames, etc. The pipeline is optimized statically. For example, the system may select a good default behavior when nothing is known about the device. This is particularly helpful if there is no policy for a particular device model (because it was not released at the time the code was written). In some implementations, the pipeline may be preconfigured ways based on mappings to known device characteristics, or at runtime based on actual observed performance.

Figure 10:
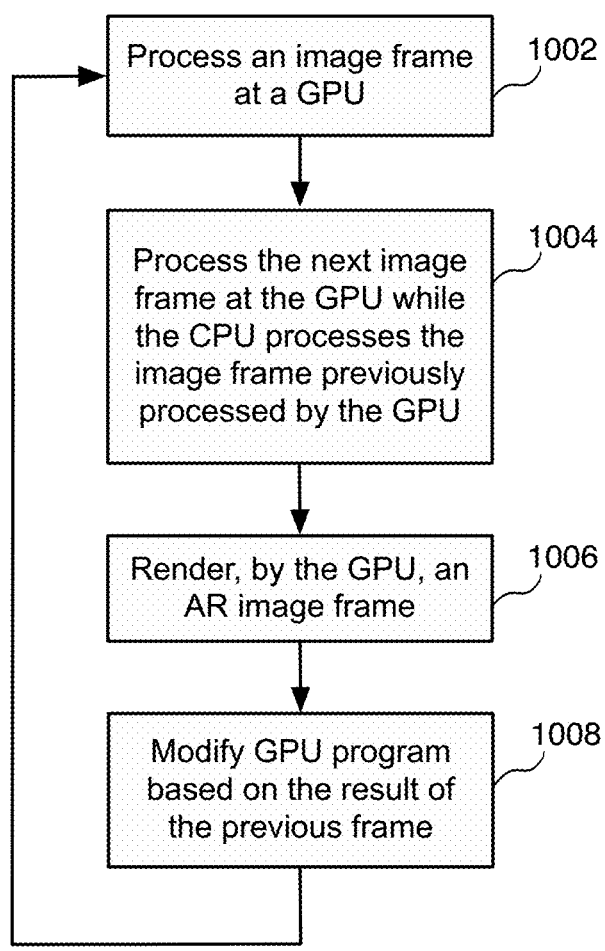
FIG. 10 illustrates an example flow diagram for executing a computation pipeline, according to some implementations.

FIG. 10 illustrates an example flow diagram for executing a computation pipeline, according to some implementations. In various implementations, the system determines in advance or at runtime an execution strategy to use to optimize performance. As described in more detail below, the system processes images in a pipeline using at least one central processing unit (CPU) and/or at least one graphics processing unit (GPU). In various implementations, the system offsets the GPU and CPU operations such that the GPU starts processing the next frame that a CPU will eventually process, while the CPU is processing the current frame. This doubles the throughput, as the processors perform in parallel. In other words, the system run the graphics card while the CPU is running on the previous image.

In various implementations, a method is initiated at block 1002, where the GPU of the system processes an image frame that will be processed by a subsequent CPU. After processing, the GPU passes the processed image frame to the CPU.

At block 1004, the GPU then processes the next image frame while the CPU processes the image frame that was previously processed by the GPU. After processing, the GPU passes the processed next image frame to the CPU, and the CPU passes the processed first image frame to another CPU for process or directly back to the GPU to render an AR image frame.

At block 1006, the GPU renders an AR image frame. In some implementations, the GPU may render the AR image frame immediately when ready. In some implementations, the GPU may render the AR image frame after a predetermined buffer time, depending on the number of CPUs processing the image frames. Example implementations involving buffer frames are described in more detail herein. The process repeats for incoming image frames.

At block 1008, the GPU modifies the GPU program based on the result of the previous frame. The step of block 1008 improves tracking and may be optional.

At block 1002, the CPU processes the next image frame and the at least one GPU processes a second image simultaneously.

Figure 11:
FIG. 11 illustrates an example target image, according to some implementations.

FIG. 11 illustrates an example target image 1100, according to some implementations. In various embodiments, target image 1100 is predetermined, where the system stores target image 1100 in any suitable storage location. In various embodiments, target image 1100 and/or statistics of target image 1100 may be stored remotely on a server and delivered to the application at runtime.

Figure 12:
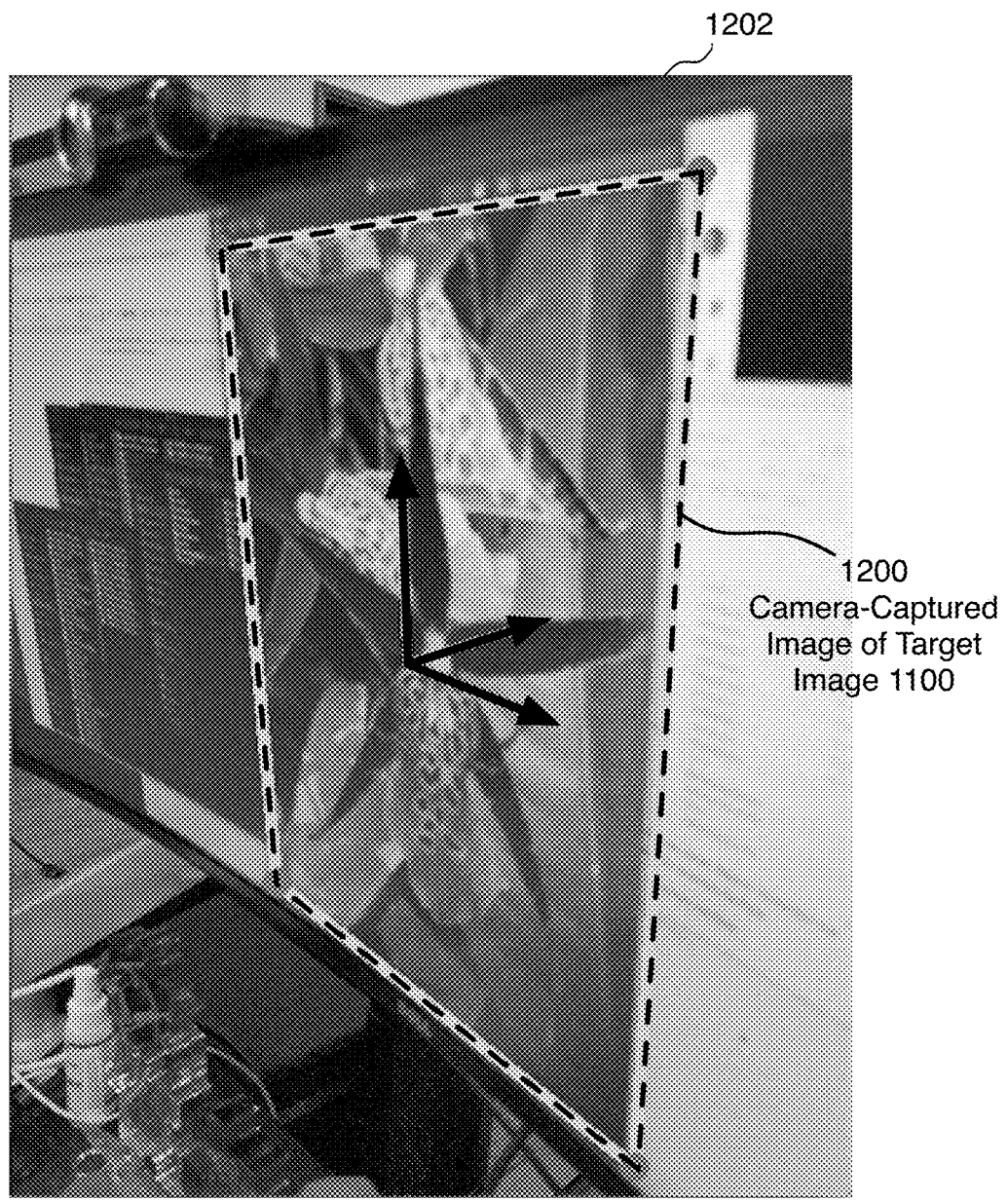
FIG. 12 illustrates an example environment showing a camera-captured image of an target image, according to some implementations.

FIG. 12 illustrates an example environment 1200 showing a camera-captured image 1200 of target image 1100, according to some implementations. As shown, target image 1100 is shown in a perspective view or camera-captured image 1200, which is displayed on a computer display screen 1202. In this example scenario, target image 1100 is detected in the previous frame along with an estimate of its position relative to the camera. In some embodiments, the estimate of the target image may include its location, orientation, and size, in some coordinate system in which the user's camera is also embedded (world space). The location may be represented as x, y, z. Also, the orientation may be represented as any suitable representation of a ray direction for a ray originating at the target's position (e.g., x, y, z Euler angles or w, x, y, z quaternion values, rotation matrix, etc.). The scale may represent the width and height of the target image in the space where the camera is also embedded. In various embodiments, the "previous frame" may be same as camera-captured image 1200. As described in more detail below, a GPU constructs a transform image, which is processed version of the camera feed (e.g., camera-captured image 1200).

Figure 13:
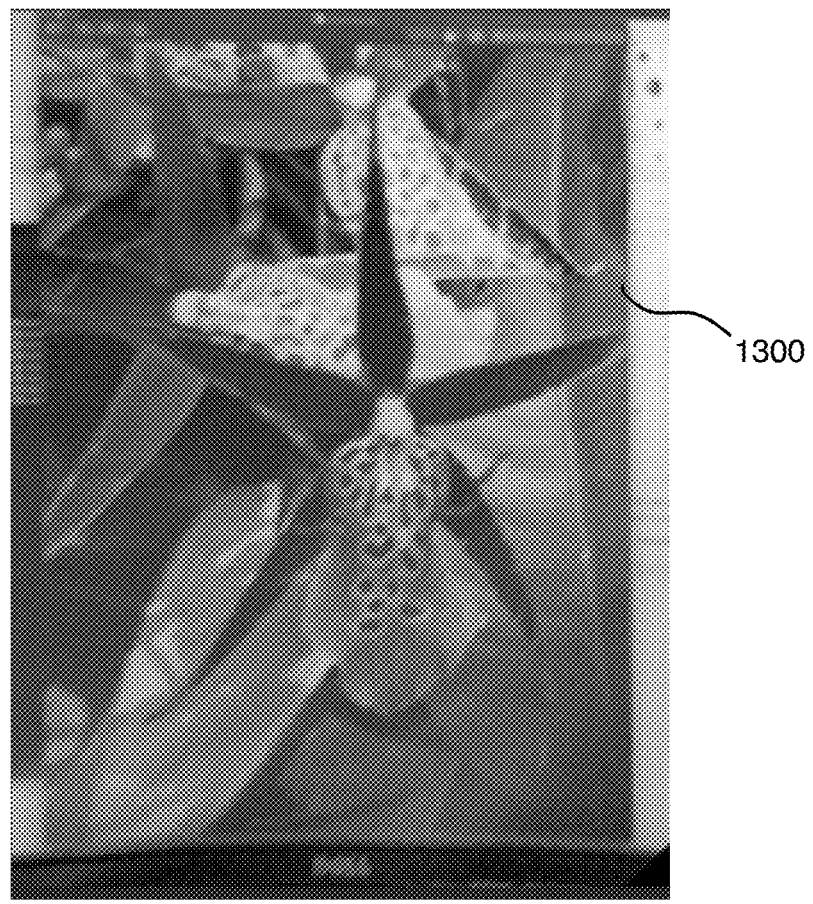
FIG. 13 illustrates an example transformed image of the camera feed, according to some implementations.

FIG. 13 illustrates an example transformed image 1300 of the camera feed, according to some implementations. In various implementations, transformed image 1300 is a GPU-computed transformation of the camera feed. The GPU predicts the transformed image 1300, which will well-match target image 1100. In various implementations, GPU system extracts feature points from transformed image 1300. The GPU constructs transform image 1300 as a perspective image warp of the source image (e.g., camera-captured image 1200). The parameters of the perspective image warp are sent to the GPU prior to the GPU processing the frame and prior to the GPU modifying its behavior in processing the frame.

In various implementations, the server (e.g., website, content distribution network, etc.) sends information about target images from the server to the application. Information about target images may include, for example, pixels, pre-computed image features, etc.). Also, information about the application identifier (ID) and/or geo-location is used by a client device to determine which images are sent by the server. For example, the user's phone (web page) may send a request to the server about the phone's current context (e.g., application id, geo-location, etc.). The server makes a decision about what image or target images to send back to the web page. When the web page receives target information from the server, the web page begins scanning for the targets configured by the server. In alternative implementations, the client (web page) may itself determine what images to scan for. In some embodiments, information about the application ID and/or geo-location is used to determine which images are processed by the client. Also, a web-service-based application may be used to manage the target images for a particular application. Also, developers may preview the performance of target images directly from the web-based application.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following is an example implementation involving a computation pipeline. In the following example implementations, the pipeline includes one GPU and one main CPU.

Figure 14:
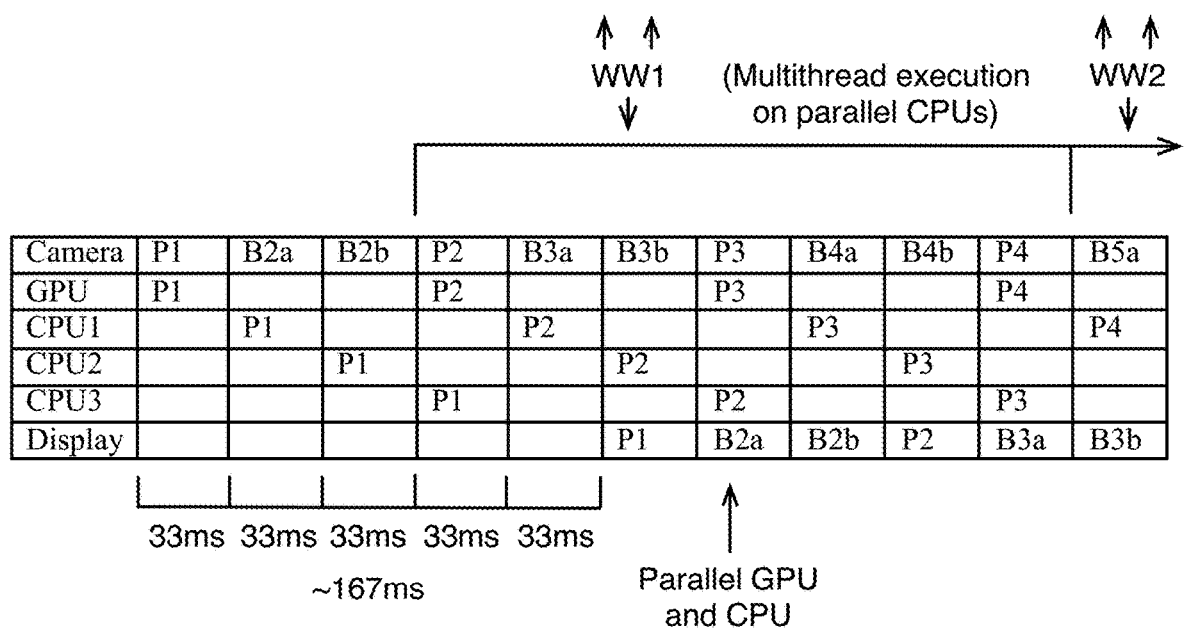
FIG. 14 illustrates a block diagram of an example computation pipeline, according to some implementations.

FIG. 14 illustrates an example computation pipeline 1400, according to some implementations. Shown are image frames captured by the camera, labeled P1, P2, P3 and P4. Also shown are buffer frames, labeled B2a, B2b, B3a, B3b, B4a, B4b, B5a, etc.

Also shown is Web Worker work (labeled WW1 and WW2) occurring in parallel on multiple CPUs (e.g., the main CPU and other CPUs not shown, etc.). As indicated above, web technologies such as Web Workers make use of multiple CPUs. While one main CPU is shown, Web Workers depicted outside of the table make use of auxiliary CPUs to perform multithread execution of JavaScript in the browser.

As shown, Web Worker WW1 is taking the results from image frame P1, doing some further processing on those results, and returning them when it is finished. At that point, Web Worker WW2 is performing further processing on the results from image frames P2 and P3, which have accumulated while Web Worker WW1 was running. In some implementations, the further processing of image frame P1 may occur on a single thread or multiple threads. In other implementations, a Web Worker may start the further processing for image frame P2 while image frame P1 is running. Examples of what the Web Works work on may include building or improving a SLAM map, or relocalizing while tracking is lost, etc.

Also shown in pipeline 1400 are a GPU and a CPU for multiple stage pipelining and interpolation for the use case of 6DoF tracking on the web. As shown, after the camera captures an image frame such as image frame P1, the GPU processes image frame P1, which will be processed by subsequent CPU stages. The GPU processes the image frame to extract feature points.

After processing, the GPU passes processed image frame P1 to the CPU. The CPU maps the feature points from the previous frame already processed by the GPU. In various implementations, the processing of the CPU is split into multiple stages (labeled CPU1, CPU2, and CPU3) and split across several captured/displayed camera frames. As such, image frame P1 is propagated to the rest of the CPUs. These multiple stages may be referred to as CPU processing stage 1, CPU processing stage 2, and CPU processing stage 3.

After the CPU processes image frame P1, the CPU sends image frame P1 back to the GPU for rendering. Knowing the locations of the feature points based on processing at the CPU, the GPU renders the AR scene with location updates.

After the GPU processes the first image frame P1, the GPU passes buffer frames B2a and B2b to the CPU and so on until displayed. Buffer frames B2a and B2b allow for multiple CPU stages to process image frames. The particular number of buffer frames may vary, depending on the number CPU processing stages. The GPU renders image frame P1 just prior to the completion of the CPU processing the next image frame P2, and so on.

In this particular example, for each image frame, there are 5 stages from being first processed by the GPU until the final rendering on the display screen. Each stage in this example is 33 ms the GPU, totaling 167 ms. As such, it takes 167 ms to be displayed.

As shown, for some image frames, the GPU work occurs in parallel with the CPU work. For example, the GPU processes image frame P2 while the CPU processes image frame P1. The GPU work may occur in parallel with a CPU on zero, one, or several frames, depending on the implementation.

In this example implementation, the system spreads computations across more than one frame (e.g., three frames with the use of buffer frames B2a, B2b, B3a, B3b, B4a, Bob, B5a, etc. The buffer frames are not processed before display, and are saved for later display. When an image frame is processed, the system displays all of the buffered frames first, using interpolated values from the previously processed frame. The system then displays the processed image frame, all while processing the next frame to process. The buffering is useful for some older devices, where it might not be possible to process an entire GPU/CPU frame in subsequent cycles.

As shown, buffered frames B2a, B2b, B3a, B3b, B4a, B4b, B5a, etc. are numbered to appear before a respective processed image frame. For example, in some implementations, buffer frames B2a and B2b appear before image frame P2. For example, as soon as image frame P2 has been processed by the GPU and the CPU, the system first displays buffer frame B2a and B2b, and then displays image P2. In some embodiments, at the start of the pipeline, the display of P1 is held until just prior to the frame on which the B2a/B2b/P2 triple become available for display.

This eliminates the need for separate stacks (e.g., GPU stack, CPU stack, and render stack) that run serially. Eliminating the separate stacks triples the process time. The system may use web technology such as Web Workers, for example, run code on additional threads in the background.

In some implementations, at runtime, the system may switch between different computation pipelines, where each computation pipeline has different numbers of CPU processing stages. The system may switch between different computation pipelines based on predetermined rules and/or policies based on device characteristics, or based on runtime performance evaluation, etc.

In various implementations, example static policies may include the following. If the system detects from the user agent string and debug renderer information that the device is a new, top tier phone, the system may select a one-stage pipeline. If the system detects that the device is a three-year old mid-range phone, the system may select a three-stage pipeline. These policies may be coded to react in a predetermined way to the characteristics of the device they are running on.

In various implementations, example dynamic policies may include the following. If the system detects at runtime that it is running at 10 frames per second (regardless of phone tier), the system may select a pipeline with more stages. If the system detects that it is running at 40 frames per second (regardless of phone tier), the system may select a pipeline with fewer stages. These policies may be coded to react to the observed performance characteristics at runtime.

In various implementations, the system captures various data including camera image data and inertial measurements. The system may then use this data to render AR images. More specifically, in various implementations, the system may use a JavaScript function to access such data using libraries provided by the browser. The JavaScript function may be getUserMedia, for example. The JavaScript may be used for access to the camera feed, or the device orientation callback may be used for inertial measurement unit (IMU) access. In various implementations, sensor data (e.g., camera feed, IMU, etc.), which come from the browser directly. Other sensor characteristics (e.g., focal length, principal point, distortion parameters, etc.) that are not given directly, may be estimated at runtime by the system analyzing sensor data. The system may also estimate these characteristics using user agent string, debug renderer info, screen resolution, etc. in order to match to a library of pre-calibrated device profiles.

In various implementations, the system accesses from the device one or more of sensor data, camera image data, and inertial measurements using web frameworks. The system may use the sensor data, camera image data, and inertial measurements in the pipeline. As a result, the system may render AR images based at least in part on one or more of the sensor data, the camera image data, and the inertial measurements.

In various implementations, the system renders the virtual 3D content using a 3D rendering engine and one or more JavaScript 3D content libraries. The system may user various combinations of 3D rendering engines to render 3D content in AR images on the web, depending on the implementation. Such 3D rendering engines may involve 3D authoring tools and 3D content libraries, depending on the implementation.

The system renders the AR frame, thereby drawing the AR frame onto the screen. The system also drives a virtual camera through a virtual scene. To achieve this, the system sets the camera at the same field of view as the virtual scene. The system drives the camera's motion by the actual motion. Possible 3D rendering engines use may include A-Frame, 3JS, Sumerian, Unity 3D, etc.

In some implementations, the system may make runtime modifications to web frameworks in order to improve their efficiency, for example by adding caching or overrides to default behavior. Specifically, in some implementations, when the system runs the AR web application (e.g., image processing, etc.), the system utilizes Javascript to allow for runtime behavior of objects, where request caching functionality is added to the WebGL functions. This significantly speeds up the operations and enables a computer vision library to live alongside other rendering libraries. In some implementations, default overrides may be added such that when the old functionality was requested, an object that also supported by functionality is returned. As such, the system may make use of new functionality alongside existing libraries.

In various implementations, the system may further improve the 6DoF tracking quality and the overall AR experience based on determining physical characteristics of the camera of the device. For example, the system may use a parsing technique such as User Agent Parsing to collect information. Such information may include device screen resolution, GPU debug information (which may include information about the GPU chip, etc. Furthermore, the system maintains a library of phones and corresponding measured characteristics. In some implementations, the system obtains camera data from a device library via the browser. The system parses the camera data. For example, the system takes a string and identifies the make and model of the device. The system also determines one or more intrinsic parameters of the camera from the parsed data. The intrinsic parameters may include field of view, principle point, distortion parameters, etc. If the make and model of the device is not readily available, the system may determine the intrinsic parameters based on other queryable device characteristics (e.g., screen resolution, debug renderer information, etc.), or may be determined at runtime by analyzing the camera feed and IMU data. For example, they system may look up the device in a database of intrinsic parameters in a device library. In some implementations, the system may dynamically adjust and improve the intrinsic parameter estimate by minimizing reprojection error using statistical estimation techniques as the system tracks the camera movement.

In various implementations, the neural network of the system determines the differences from one image frame to the next image frame (e.g., from image frame 700 of FIG. 7 to image frame 800 of FIG. 8) based on the positional information associated with each image frame that is input to the neural network.

Figure 15:
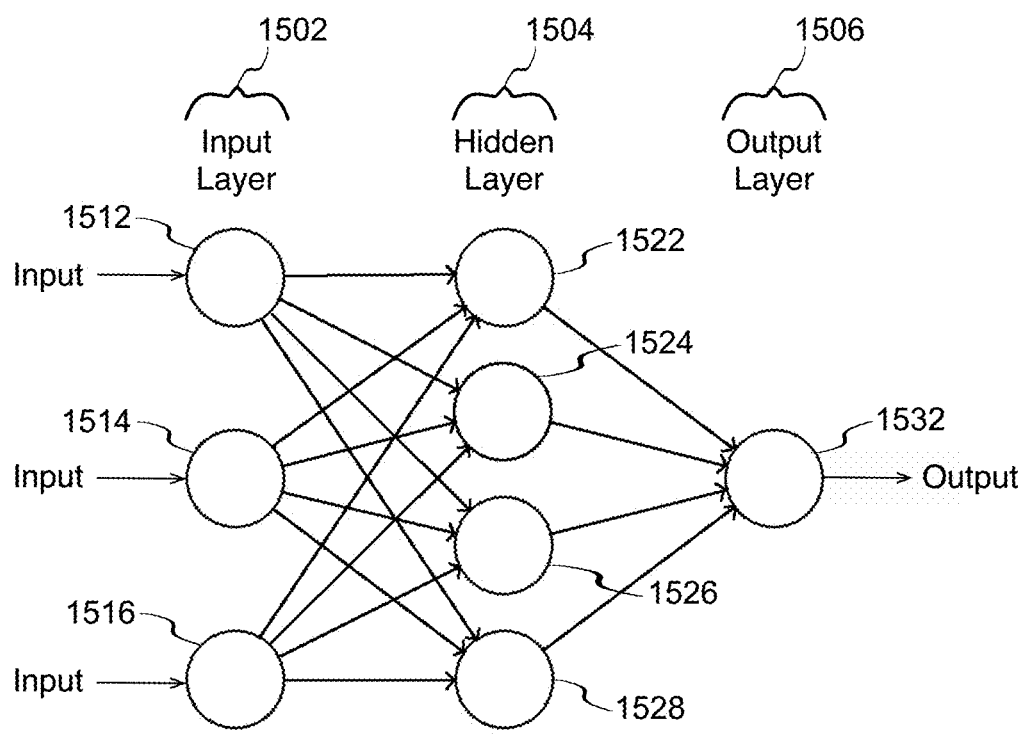
FIG. 15 illustrates a block diagram of an example neural network, which may be used for some implementations described herein.

FIG. 15 illustrates a block diagram of an example neural network 1500, which may be used for some implementations described herein. Various implementations described herein, including the determination of the motion of the camera is performed by neural network 1500. In various implementations, as information flows through neural network 1500, neural network 1500 adapts or learns based on the information each node receives. As such, neural network 1500 is a computational model based on the structure and functions of biological neural networks. Neural network 1500 may also be referred to as an artificial intelligence neural network or neural net.

As shown, neural network 1500 has an input layer 1502, a hidden layer 1504, and an output layer 1506. Input layer 1502 includes input nodes 1512, 1514, and 1516. Hidden layer 1504 includes hidden nodes 1522, 1524, 1526, and 1528. While one hidden layer is shown, there may be zero hidden layers, one hidden layers, or more than one hidden layer. Output layer 1506 includes output node 1532.

In various implementations, the nodes of neural network 1500 are connected by unidirectional communication channels or connections, which carry numeric data. In some implementations, the nodes operate on their local data and on the inputs they receive via the connections.

In various implementations, neural network 1500 receives at its input nodes 1512, 1514, and 1516 from various inputs associated with map points. For example, in various implementations, input to neural network 1500 includes images such as digitized 2D image frames captured by a camera.

In various implementations, neural network 1500 may receive at its input nodes 1512, 1514, and 1516 other types of information associated with a camera. For example, in some implementations, input to neural network 1500 may also include inertial information associated with a camera. In some implementations, the inertial information may include gyro information provided by one or more gyro sensors, acceleration information provided by an accelerometer, compass information provided by a compass, and other types inertial information. In some implementations, the inertial information may be used to determine translational and/or rotational changes of a camera. In some implementations, input to neural network 1500 may also include depth information provided by one or more depth sensors, and other information associated with one or more virtual feature points in images captured by a camera. Neural network 1500 may use any combination of these types of inputs including sensor information independently, in addition to, or in lieu of visual information such as image frames.

In various implementations, hidden nodes 1522, 1524, 1526, and 1528 each have an output that is connected to the inputs of other nodes, which may include other hidden nodes or output nodes. Hidden nodes are hidden in that they not visible as a network output. Based on the various inputs, hidden nodes 1522, 1524, 1526, and 1528 determine 2D and 3D changes in positional information. As indicated herein, in various implementations, information associated with 3D changes in the 3D environment inherently includes information associated with 2D changes in 2D windows of image frames. For example, such changes may include changes to six degrees of freedom variables of one or more map points, as well as changes in other variables associated with one or more physical feature points (e.g., changes in inertial information, changes in depth information etc.).

Neural network 1500 determines actual motion of a camera within the 3D environment from 2D digitized image frames and/or other sensor information (e.g., inertial information, depth information, and other information input to neural network 1500, etc.). In other words, neural network 1500 determines not merely motion within the 2D image frames but also other information in the real world, such as 3D motion and changes in 3D positional information associated with physical feature points in the physical environment.

Neural network 1500 may determine any translational motion of camera 102. For example, neural network 1000 may determine that camera 102 has moved closer to target image 108 by a particular distance (e.g., 4 feet, etc.). Neural network 1000 may determine any rotational motion of camera 102. For example, neural network 1500 may determine that camera 102 has rotated relative to target image 108 by a particular number of degrees (e.g., 20 degrees, etc.). These are example changes in the position of camera 102 relative to target image 108. The actual amount of change and what variables change (e.g., six degrees of freedom variables) may vary, and will depend on the particular implementation. Alternatively, a neural network may extract key points that are inputs to a SLAM system.

In various implementations, hidden nodes 1522, 1524, 1526, and 1528 of neural network 1500 may determine various information associated with one or more physical feature points in the physical environment. For example, hidden nodes 1522, 1524, 1526, and 1528 may determine any motion information, including what positional information (e.g., positional variables, etc.) that has changed, and the amount of change. In various implementations, hidden nodes 1522, 1524, 1526, and 1528 of neural network 1500 perform their functions in parallel, which increases performance. Outputs provided by hidden nodes 1522, 1524, 1526, and 1528 may be referred to as intermediate outputs.

In various implementations, neural network 1500 automatically learns and automatically reconciles information from visual and sensor data from camera 102 and/or one or more sensors. For example, neural network 1500 may combine visual or sensor information that corroborates, where information corroborates if the information is consistent. Neural network 1500 may ignore visual or sensor information that does not corroborate, where information does not corroborate if the information is not consistent.

As described in more detail herein, neural network 1500 may predict all the virtual feature points that may be relevant in subsequent image frames. Such information may be used to remove jitter and or any shakiness in a given image frame.

As described in more detail herein, in various implementations, output node 1532 of neural network 1500 outputs a self-position of camera 102 in the physical environment, as wells changes in position (motion) of camera 102 in the physical environment from the capturing of one image to the next. In various implementations, neural network 1500 outputs higher quality estimates of total global motion based on the motion information.

For ease of illustration, FIG. 15 shows neural network 1500 as having three inputs 1512, 1514, and 1516, four hidden nodes 1522, 1524, 1526, and 1528, and one output node 1532. Neural network 1500 may have any number of input nodes, hidden nodes, and output nodes, and the particular numbers will depend on the particular implementation. Similarly, FIG. 15 shows neural network 1500 as having one hidden layer. Neural network 1500 may have any number of hidden layers, and the particular number will depend on the particular implementation. In various implementations, neural network 1500 may not have all of the components shown and/or may have other elements including other types of nodes and other types of layers instead of, or in addition to, those shown herein.

In some implementations, neural network 1500 is a recurrent neural network. In various implementations, a recurrent neural network has "memory" in that the recurrent neural network uses information from previous network evaluations as inputs to the network for future evaluations. In the context of implementations described herein, a recurrent neural network may be used to implicitly remember appearance information about points in the map point space that are being tracked. A recurrent neural network may also be used to remember motion patterns and model the active motion characteristics (e.g., velocity, acceleration, jitter, etc.).

In some implementations, neural network 1500 is a convolutional neural network. In various implementations, a convolutional neural network has convolutional layers within the network, where each convolutional layer may be a function applied to a subwindow around that position in the prior layer. The functions may be trained to be identical throughout the layer. In various implementations, the functions may be 2D feature patches that provide representational information about 2D images.

In some implementations, the determining of motion information is based on training of the neural network. Such training may facilitate neural network 1500 in understanding local movement of various virtual feature points between image frames. For example, training may facilitate neural network 1500 in interpreting observed behaviors associated with six degrees of separation and how such behaviors manifest in the physical environment.

In various implementations, training may include providing ground truth to the neural network (known inputs and outputs). Through optimized gradient descent and similar techniques, training may also include adjusting network weights such that a provided input activates the neural network to produce the provided output (or close to it).

In various implementations, ground truth for the system may be generated in any of the following ways. In some implementations, the system may render realistic, synthetic 3D scenes (e.g., computer graphics) along with the corresponding 3D depth information, and generate videos of a synthetic camera moving through the scene. This visual data may be used to train a system that learns to recognize motion from the synthetic video. This approach may be augmented by including synthetic sensor data as well (e.g., gyro, accelerometer, etc.) by mimicking the real motion and adding noise to the measurements.

In some implementations, the system may use an alternative (and possibly slow but accurate) SLAM system to generate the ground truth. For example, the system may capture video and sensor data coming from a cell phone or other capture device. This data may be passed to a conventional SLAM system that computes the motion output. This computed output along with the captured input may be used as ground truth to train the network. Since the ground truth data does not have to be computed in real time, the conventional SLAM system may be run in a slow (non-real time) but high-accuracy, high-computation mode to ensure the quality of the computed output is good.

In some implementations, the system may capture ground truth data with a specialized hardware system or hardware device. In various implementations, the hardware system or hardware device is configured for high accuracy. For example, the sensor and video input data may be captured by a hardware device such as a cell phone, which is itself being tracked by a cinematic motion capture system to determine the highly accurate ground truth data such as exact position and motion of the hardware device. Such truth data may then be inputted into the neural network for training.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 16:
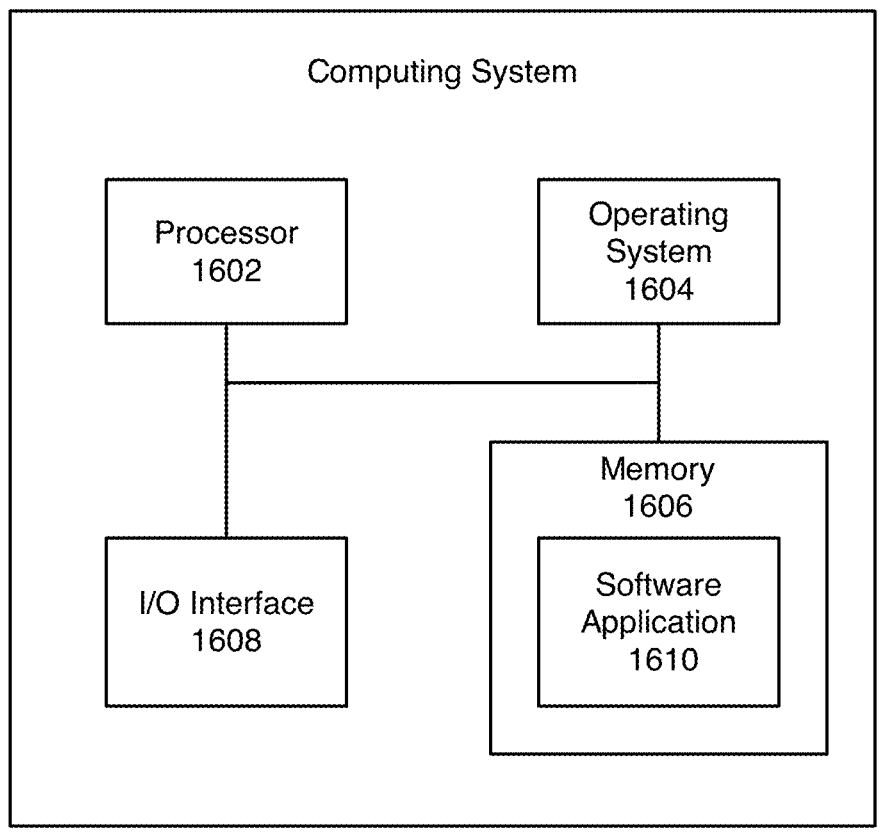
FIG. 16 illustrates a block diagram of an example computing system, which may be used for some implementations described herein.

FIG. 16 illustrates a block diagram of an example computing system 1600, which may be used for some implementations described herein. For example, computing system 1600 may be used to implement neural network 1600 of FIG. 16, as well as to perform implementations described herein. In some implementations, computing system 1600 may include a processor 1602, an operating system 1604, a memory 1606, and an input/output (I/O) interface 1608. In various implementations, processor 1602 may be used to implement various functions and features described herein, as well as to perform the method implementations described herein. While processor 1602 is described as performing implementations described herein, any suitable component or combination of components of computing system 1600 or any suitable processor or processors associated with computing system 1600 or any suitable system may perform the steps described. Implementations described herein may be carried out on a user device, on a server, or a combination of both.

Computing system 1600 also includes a software application 1610, which may be stored on memory 1606 or on any other suitable storage location or computer-readable medium. Software application 1610 provides instructions that enable processor 1602 to perform the implementations described herein and other functions. Software application 1610 may also include an engine such as a network engine for performing various functions associated with one or more networks and network communications. The components of computing system 1600 may be implemented by one or more processors or any combination of hardware devices, as well as any combination of hardware, software, firmware, etc.

Computing system 1600 also includes an inertial measurement unit 1612. Inertial measurement unit 1612 is an electromechanical device that measures acceleration forces. Such forces may be static, such as the constant force of gravity pulling at inertial measurement unit 1612. Such forces may be dynamic, caused by moving or vibrating the accelerometer. As indicated above, inertial measurement unit 1612 may be used to detect the direction of gravity, which may be used to determine the motion of a camera.

For ease of illustration, FIG. 16 shows one block for each of processor 1602, operating system 1604, memory 1606, I/O interface 1608, and software application 1610. These blocks 1602, 1604, 1606, 1608, and 1610 may represent multiple processors, operating systems, memories, I/O interfaces, and software applications. In various implementations, computing system 1600 may not have all of the components shown and/or may have other elements including other types of components instead of, or in addition to, those shown herein.

In various implementations, computing system 1600 includes logic encoded in one or more non-transitory computer-readable storage media for execution by the one or more processors. When executed, the logic is operable to perform operations associated with implementations described herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors;
logic encoded in one or more non-transitory computer-readable storage media for execution by the one or more processors and when executed operable to perform operations comprising:
capturing images of a physical scene with a camera of a device;
obtaining camera data from a device library via a browser of the device;
parsing the camera data;
determining one or more intrinsic parameters of the camera, wherein the one or more intrinsic parameters comprise at least one or more of a field of view, a principal point, and distortion parameters;
determining motion of the camera using six degrees of freedom (6DoF) marker-based tracking;
determining positions of markers relative to the camera using 6DoF marker-based tracking;
overlaying virtual content onto a depicted physical scene in the images, resulting in augmented reality (AR) images; and
rendering the AR images in the browser of the device.

2. The system of claim 1, wherein the logic when executed performs the operations based at least in part on a web application that is executed in the browser, and wherein the web application is based at least in part on C++ code that is revised to optimize performance of generated JavaScript.

3. The system of claim 1, wherein the logic when executed is further operable to perform operations based at least in part on a predetermined subset of JavaScript transpiled or compiled from source code of another programming language.

4. The system of claim 1, wherein the logic when executed is further operable to perform operations comprising:
processing the images using a computer program executed on a graphics processing unit;
extracting feature points from the images; and
performing runtime optimizations to JavaScript frameworks.

5. The system of claim 1, wherein the logic when executed is further operable to perform operations comprising performing multithread execution of JavaScript in the browser.

6. The system of claim 1, wherein the logic when executed is further operable to perform operations comprising:
determining in advance or at runtime an execution strategy to use to optimize performance; and
processing image frames in a pipeline using at least one central processing unit (CPU) and at least one graphics processing unit (GPU), wherein the least one CPU processes a first image frame that was previously processed by the at least one GPU, and wherein the at least one CPU processes the first image frame and the at least one GPU processes a second image frame simultaneously.

7. The system of claim 1, wherein the logic when executed is further operable to perform operations comprising:

accessing from the device one or more of sensor data, camera image data, and inertial measurements using web frameworks; and rendering the AR images based at least in part on one or more of the sensor data, the camera image data, and the inertial measurements.

8. The system of claim 1, wherein the logic when executed is further operable to perform operations comprising rendering the virtual content using a rendering engine and a JavaScript content library.

9. A non-transitory computer-readable storage medium carrying program instructions thereon, the instructions when executed by one or more processors are operable to perform operations comprising:

capturing images of a physical scene with a camera of a device;

obtaining camera data from a device library via a browser of the device;

parsing the camera data;

determining one or more intrinsic parameters of the camera, wherein the one or more intrinsic parameters comprise at least one or more of a field of view, a principal point, and distortion parameters;

determining motion of the camera using six degrees of freedom (6DoF) marker-based tracking;

determining positions of markers relative to the camera using 6DoF marker-based tracking;

overlaying virtual content onto a depicted physical scene in the images, resulting in augmented reality (AR) images; and rendering the AR images in the browser of the device.

10. The computer-readable storage medium of claim 9, wherein the instructions when executed perform the operations based at least in part on a web application that is executed in the browser, and wherein the web application is based at least in part on C++ code that is revised to optimize performance of generated JavaScript.

11. The computer-readable storage medium of claim 9, wherein the instructions when executed are further operable to perform operations based at least in part on a predetermined subset of JavaScript transpiled or compiled from source code of another programming language.

12. The computer-readable storage medium of claim 9, wherein the instructions when executed are further operable to perform operations comprising:

processing the images using a computer program executed on a graphics processing unit;

extracting feature points from the images; and performing runtime optimizations to JavaScript frameworks.

13. The computer-readable storage medium of claim 9, wherein the instructions when executed are further operable to perform operations comprising performing multithread execution of JavaScript in the browser.

14. The computer-readable storage medium of claim 9, wherein the instructions when executed are further operable to perform operations comprising:

determining in advance or at runtime an execution strategy to use to optimize performance; and processing image frames in a pipeline using at least one central processing unit (CPU) and at least one graphics processing unit (GPU), wherein the least one CPU processes a first image frame that was previously processed by the at least one GPU, and wherein the at least one CPU processes the first image frame and the at least one GPU processes a second image frame simultaneously.

15. The computer-readable storage medium of claim 9, wherein the instructions when executed are further operable to perform operations comprising:

accessing from the device one or more of sensor data, camera image data, and inertial measurements using web frameworks; and rendering the AR images based at least in part on one or more of the sensor data, the camera image data, and the inertial measurements.

16. The computer-readable storage medium of claim 9, wherein the instructions when executed are further operable to perform operations comprising rendering the virtual content using a rendering engine and a JavaScript content library.

17. A computer-implemented method comprising:

capturing images of a physical scene with a camera of a device;

obtaining camera data from a device library via a browser of the device;

parsing the camera data;

determining one or more intrinsic parameters of the camera, wherein the one or more intrinsic parameters comprise at least one or more of a field of view, a principal point, and distortion parameters;

determining motion of the camera using six degrees of freedom (6DoF) marker-based tracking;

determining positions of markers relative to the camera using 6DoF marker-based tracking;

overlaying virtual content onto a depicted physical scene in the images, resulting in augmented reality (AR) images; and rendering the AR images in the browser of the device.

18. The method of claim 17, wherein the method performs the steps based at least in part on a web application that is executed in the browser, and wherein the web application is based at least in part on C++ code that is revised to optimize performance of generated JavaScript.

* * * * *